(12) United States Patent
Troiano (10) Patent No.: US 11,718,001 B2
(45) Date of Patent: Aug. 8, 2023

(54) PROCESS OF OVER-MOLDING A THERMOPLASTIC ELASTOMER OVER FABRIC PIECES

(71) Applicant: Gramercy Products, LLC, Secaucus, NJ (US)

(72) Inventor: Daniel Troiano, Secaucus, NJ (US)

(73) Assignee: Gramercy Products, LLC, Secaucus, NJ (US)

( * ) Notice: Subject to any disclaimer, the term of this patent is extended or adjusted under 35 U.S.C. 154(b) by 203 days.

(21) Appl. No.: 17/363,317

(22) Filed: Jun. 30, 2021

(65) Prior Publication Data

US 2021/0387387 A1    Dec. 16, 2021

Related U.S. Application Data

(63) Continuation-in-part of application No. 15/951,447, filed on Apr. 12, 2018, now Pat. No. 11,059,209.

(60) Provisional application No. 62/485,039, filed on Apr. 13, 2017.

(51) Int. Cl.
| | |
|---|---|
| *B29C 45/53* | (2006.01) |
| *B29C 45/14* | (2006.01) |
| *B29C 45/00* | (2006.01) |
| *B29C 45/26* | (2006.01) |
| *B29K 101/12* | (2006.01) |

(52) U.S. Cl.
CPC .... *B29C 45/14786* (2013.01); *B29C 45/0053* (2013.01); *B29C 45/14311* (2013.01); *B29C 45/2669* (2013.01); *B29C 2045/14327* (2013.01); *B29K 2101/12* (2013.01); *B29K 2713/00* (2013.01)

(58) Field of Classification Search
None
See application file for complete search history.

(56) References Cited

U.S. PATENT DOCUMENTS

| | | |
|---|---|---|
| 2,080,783 A | 5/1937 | Petersen |
| 2,304,461 A | 12/1942 | Knowles |
| 2,478,013 A | 8/1949 | Roddy |

(Continued)

OTHER PUBLICATIONS

Dimensional Tolerancing Factors Affecting Tolerances, Wayback Machine Feb. 1, 2017, Molded Dimensions Inc.

(Continued)

*Primary Examiner* — Jacob T Minskey
*Assistant Examiner* — Adrien J Bernard
(74) *Attorney, Agent, or Firm* — Thomas A. O'Rourke; Bodner & O'Rourke, LLP (57) ABSTRACT

A method of over-molding a thermoplastic material over fabric includes: precision forming a mold cavity to match the final dimensions of a finished product; cutting a piece of fabric to a correct size; fixedly securing the fabric piece in the mold cavity; and injecting a thermoplastic material into the mold cavity at an appropriate temperature and pressure, on top of the fabric piece. The method may further include heating the thermoplastic material to a temperature for melting a surface layer of the fabric when injected thereon, and cooling of the thermoplastic material and fabric for bonding of the thermoplastic material to the surface of the fabric. The method may further include adding one or more additives from the group of additives consisting of: a UV stabilizer, an anti-blocking agent, a slip agents, a plasticizer, and a flame retardant; and securing a cord member onto an exposed portion of the fabric.

10 Claims, 6 Drawing Sheets

(56) References Cited

U.S. PATENT DOCUMENTS

| | | |
|---|---|---|
| 2,903,389 A | 9/1959 | Fujita |
| 5,093,067 A | 3/1992 | Gibson |
| 2004/0161623 A1 | 8/2004 | Domine |
| 2008/0017304 A1 | 1/2008 | Sell |
| 2016/0038801 A1 | 2/2016 | Morrow |
| 2016/0052234 A1 | 2/2016 | Watanabe |
| 2017/0043518 A1 | 2/2017 | Narayanaswamy |

OTHER PUBLICATIONS https://web.archive.org/web/20170201032517/https://moldeddimensions.com/dimensional-tolerancing.php (Year: 2017).

PROCESS OF OVER-MOLDING A THERMOPLASTIC ELASTOMER OVER FABRIC PIECES

CROSS REFERENCES TO RELATED APPLICATIONS

This application is a continuation-in-part of U.S. application Ser. No. 15/951,447, filed on Apr. 12, 2018, which claims priority on U.S. Provisional Application Ser. No. 62/485,039, filed on Apr. 13, 2017, all disclosures of which are incorporated herein by reference.

FIELD OF THE INVENTION

The present invention relates to molded parts, and more particularly to a process of over-molding an elastomeric material over a fabric.

BACKGROUND OF THE INVENTION

Plastic material is typically formed of organic polymers with a high molecular mass, and can be combined with other components to enhance the performance of the material for specific applications. The polymers for a plastic material are usually derived from petrochemicals (i.e., fossil-fuel plastics), but may also be formed from the polymers of biomass sources to produce so-called bioplastics.

There are two broad categories of plastic materials—thermoplastic (or thermo-softening), and thermosetting. A thermosetting polymer can be melted once only to take a certain shape, after which it cures irreversibly. Conversely, thermoplastics may be repeatedly softened or even melted upon being heated to the appropriate temperature. Thermoplastic materials may be further subdivided, based upon the structure of the polymer molecule, which determines its melting and welding characteristics, into amorphous and semi-crystalline thermoplastics.

A thermoplastic elastomer, abbreviated as TPE or TPR or TPU, and also referred to as a thermoplastic rubber, consists of a mix of polymer materials that possess both thermoplastic and elastomeric properties, and typically has elastic performance and characteristics at room temperatures. A thermoplastic elastomer material can be formed into different shapes during a molding process that entails: elevating the plastic material to temperatures that cause it to transform into a flowable liquid state; pressing the liquidized plastic using high-pressures into the cavity of the mold; and cooling of the mold for cooling of the material to permit it to solidify and take on the desired shape.

The mold utilized is a tool that is specifically made to produce the particular plastic product. The injection molding manufacturing process is often utilized for mass production of complex shapes, parts, and finished products.

A method of molding a thermoplastic elastomer is shown by U.S. Pat. No. 2,080,783 to Petersen. Injection molding apparatus is disclosed by U.S. Pat. No. 2,304,461 to Knowles. U.S. Pat. No. 2,478,013 to Roddy is for a process of preparing and fashioning thermoplastic and thermosetting materials. U.S. Pat. No. 2,903,389 to Fujita is for a method of molding reinforced plastics. U.S. Pat. No. 5,093,067 to Gibson is for injection molding of fabric reinforced elastomeric diaphragms.

The present invention offers improvements to the manufacturing of molded parts formed of a thermoplastic elastomer, and the improved product and manufacturing process can be done using a standard plastic injection molding machine.

OBJECTS OF THE INVENTION

It is an object of the invention to provide an improved process usable for molding of thermoplastic elastomers.

It is another object of the invention to provide a process for molding of a thermoplastic elastomer material over one or more pieces of fabric.

It is a further object of the invention to provide an improved injection molding process that may facilitate producing a fabric part with greater flexibility through over-molding of the fabric with a thermoplastic elastomer.

Further objects and advantages of the invention will become apparent from the following description and claims, and from the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this document are incorporated herein in their entirety by reference.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variation resulting from a stack up (i.e., the sum) of multiple individual tolerances.

Figure 1:
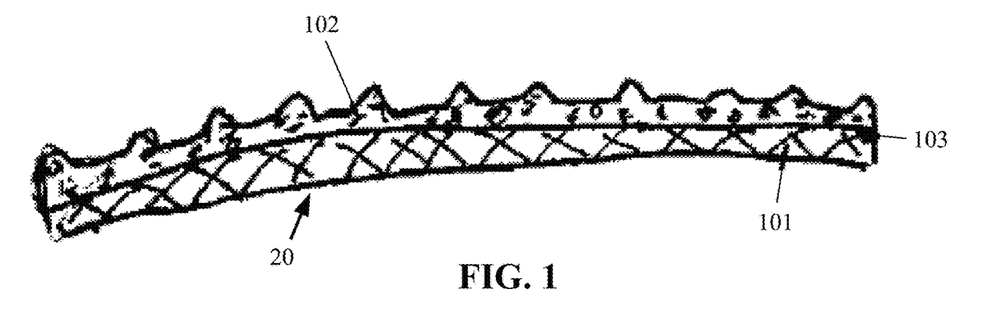
FIG. 1 illustrates a cross-sectional view of a part formed in accordance with the manufacturing process of the present invention, and includes a fabric piece, over-molded thermoplastic elastomer material, and additional cotton/polyester cords affixed thereto.
Figure 1A:
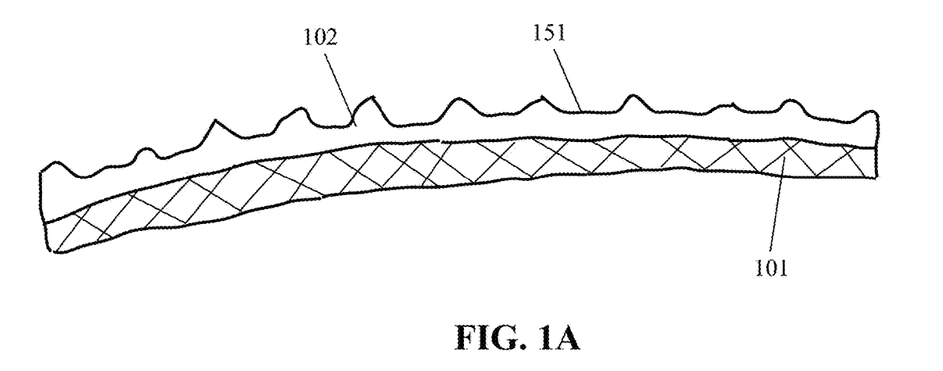
FIG. 1A illustrates a cross-sectional view showing the fabric used for the finished part of FIG. 1, but while positioned within the specially designed mold cavity.
Figure 1B:
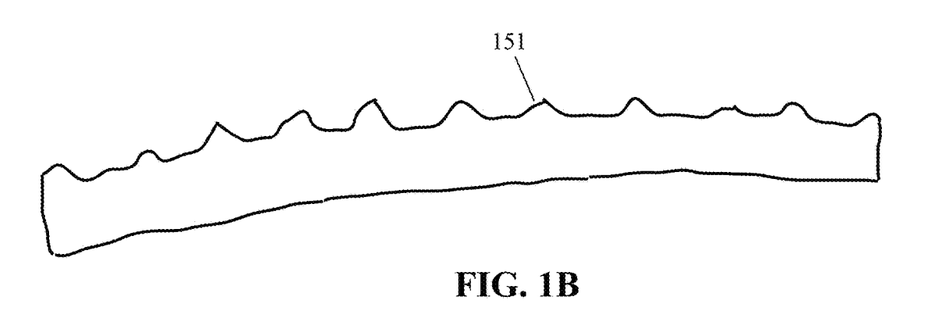
FIG. 1B shows the mold cavity of FIG. 1A, prior to receiving the fabric therein.

In accordance with at least one embodiment of the present invention, an injection mold tool 151, as shown within FIG. 1B, may be formed to produce the part 20 shown within FIG. 1, which may be a combination of fabric 101 and plastic elastomer 102. The mold tool 151 may include a precision-formed cavity that is based upon the final dimensions of the particular finished part, and other physical and structural considerations. In particular, for the injection molding process, the thermoplastic elastomer may be over-molded onto the fabric piece on at least one side of a fabric substrate. The injection mold 151 is designed and made according to the finished product size, and its shape, and requires an accurate calculation of the fabric thickness and size, as well as the thickness of the over-molded thermoplastic elastomer that is desired, which may typically be in the range of 0.5 mm to 15 mm or more, depending upon the design. The design of the mold 151 also must include features relating to securing of the fabric within the mold cavity, and the mold may include a fixture and other accessories that may be used to precisely locate and fix the fabric piece within the mold cavity, which is also critical to forming the finished product.

For this injection molding process, a piece of fabric is cut to the correct size and is fixed in the mold cavity. The thermoplastic material, which is preferably a thermoplastic elastomer, is then injected into the mold cavity at the appropriate temperature and pressure, on top of the fabric piece. The thermoplastic elastomer and fabric piece will be bonded together after cooling, without the use of a bonding agent. In one embodiment, depending on the closeness of the fabric weave the thermoplastic may be only on the surface of the fabric and bonded to the fabric. In another embodiment, the thermoplastic material may be applied at a temperature that is sufficiently high that the surface material of the fabric, if it is a thermoplastic, may undergo some melting, and the fabric may then bond to the thermoplastic being injection molded. In still another embodiment the thermoplastic may flow into the interstices of the weave of the fabric piece and secure the thermoplastic to the fabric. The molding process is conducted without any auxiliary chemicals or adhesive to combine or secure these two materials together, and is very safe, non-toxic, and fast. The thermoplastic elastomer and fabric piece are conjoined in this fashion to make the new product, which may in itself serve as a raw material for the making of a finished commercial product, and is very durable and very difficult to pull apart or crack.

Figure 2:
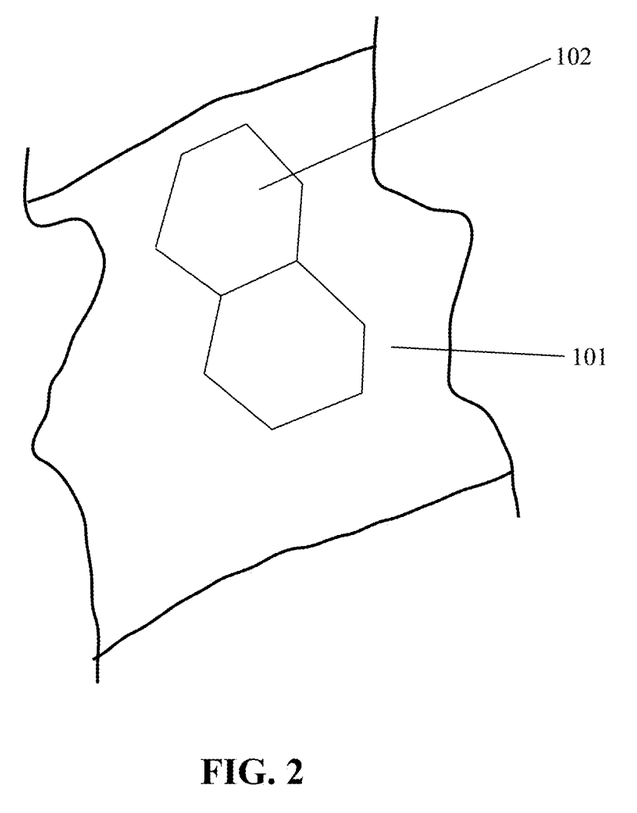
FIG. 2. Illustrates a side view of a fabric material, a portion of which is over-molded with a thermoplastic elastomer in accordance with the process of the present invention.

The finished product 20 has the elastic performance and characteristic of the thermoplastic elastomer with additional strength being provided by the fabric. Also, only a portion of the fabric piece may be over-molded with the thermoplastic elastomer, as seen in FIG. 2, and the exposed fabric it can be sewn together to make toys and cloth products. There is no limitation for the shape or size of the over-molded fabric piece formed in accordance with the present invention. The thermoplastic elastomer increases the thickness and flexibility of the product, and at the same time improves its abrasion resistance. The fabric utilized may be printed or dyed to provide the product with a better exterior appearance and diversity.

As shown in FIG. 1, additional cord members 103 made of a desired material, including, but not limited to, the same material as the fabric or a different material, may be added to the part. The fabric and/or the cord material may be made of natural fibers such as cotton, linen, bamboo, jute wool, etc., or it can be made of manmade fibers including but not limited to nylons, polyolefin fibers, polyesters and blends thereof Additives, such as stabilizers such as UV stabilizers, anti-blocking agents, slip agents, plasticizers, flame retardants, biodegradable additives, etc., may be added onto the finished product to increase the product functionality. The cord members 103 may be sewed or tied onto the exposed fabric. The cord members 103 may be used to increase functionality of the final product. For example, a cord may be secured to the part to be used as a handle for tossing of the part, such as when the part may be a dog toy. A cord member 103 may also act as a decorative item, and may, for example, be secured to the fabric to serve as an appendage, such as a tail of the pet toy.

Figure 3:
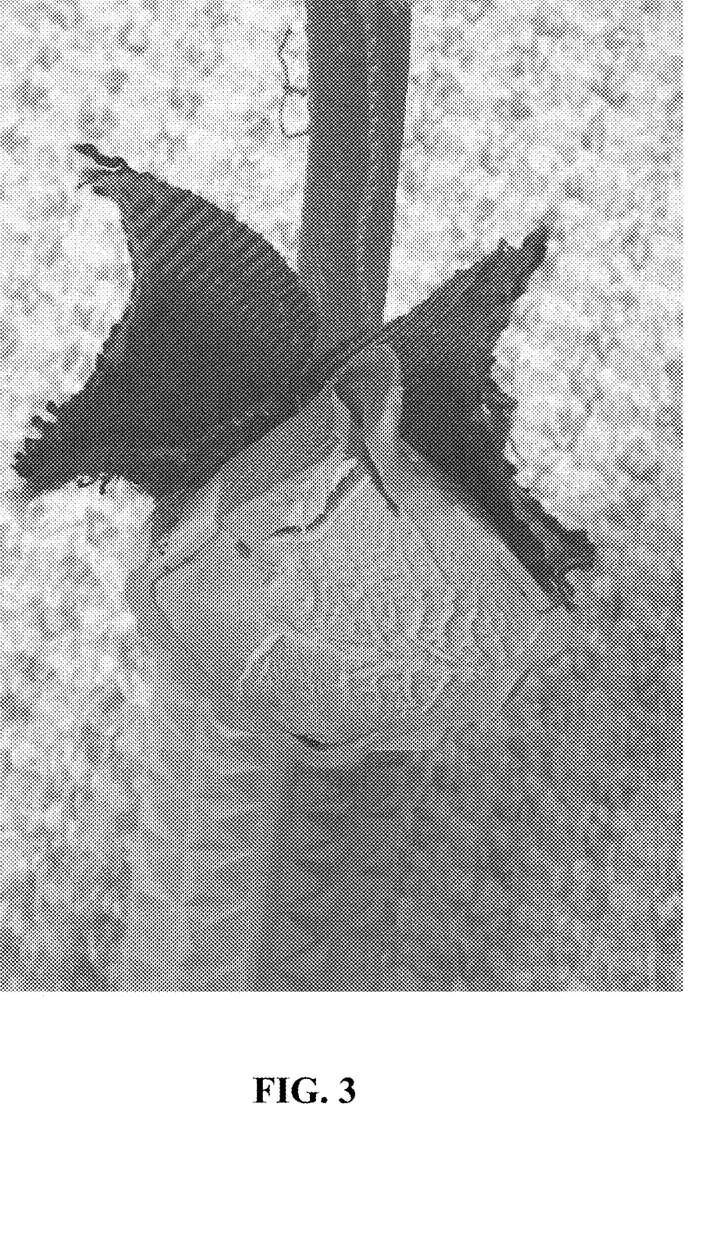
FIG. 3 is a cross-sectional view of a ring formed with a core of foam, a layer of rubber, and two separate pieces of fabric that are adhered to the rubber as a result of the forming process.

FIG. 3 illustrates a cross-sectional view of a ring formed with a core of foam, a layer of rubber, and two separate pieces of fabric that are adhered to the rubber as a result of the forming process of the present invention.

Figure 4:
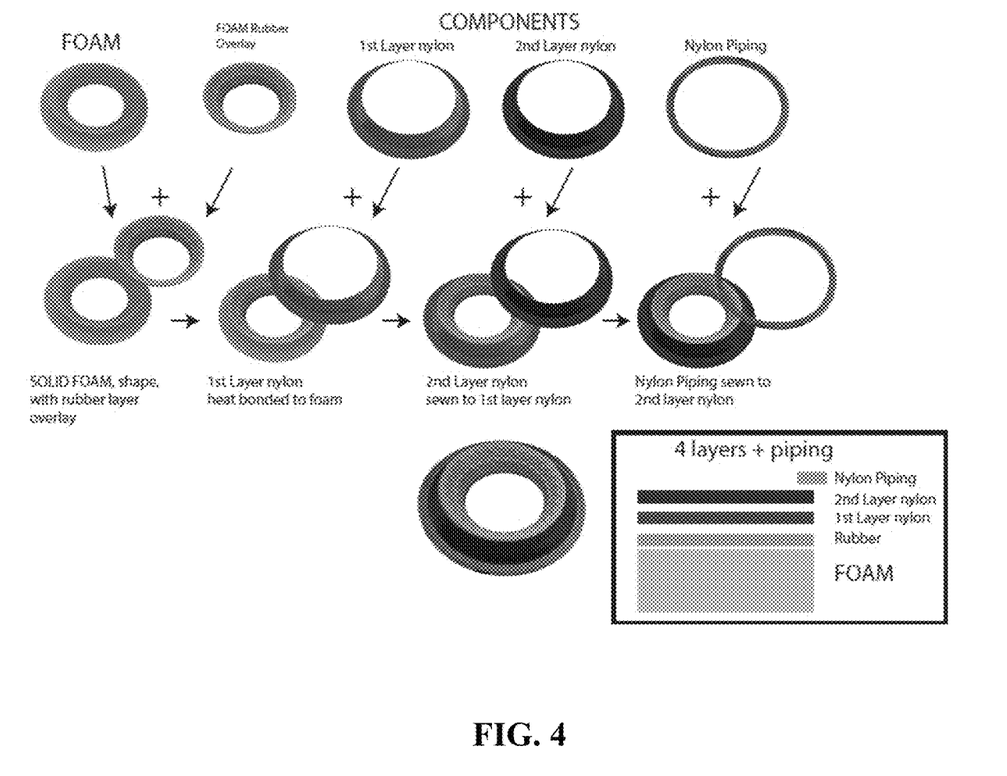
FIG. 4 illustrates another embodiment of the process used for forming a ring in accordance with the present invention, beginning with a core of foam, having rubber overlaid thereon, with a first layer of nylon applied onto the rubber, being heat bonded thereto, and with a second layer of nylon being applied to the first layer of nylon, by being sewn thereto, and with piping being sewn onto the second layer of nylon.

FIG. 4 illustrates the process of forming a ring in accordance with the present invention, beginning with a core of foam, having rubber overlaid thereon, with a first layer of nylon applied onto the rubber, being heat bonded thereto, and with a second layer of nylon being applied to the first layer of nylon, by being sewn thereto, and with piping being sewn onto the second layer of nylon.

Figures 5A, 5B:
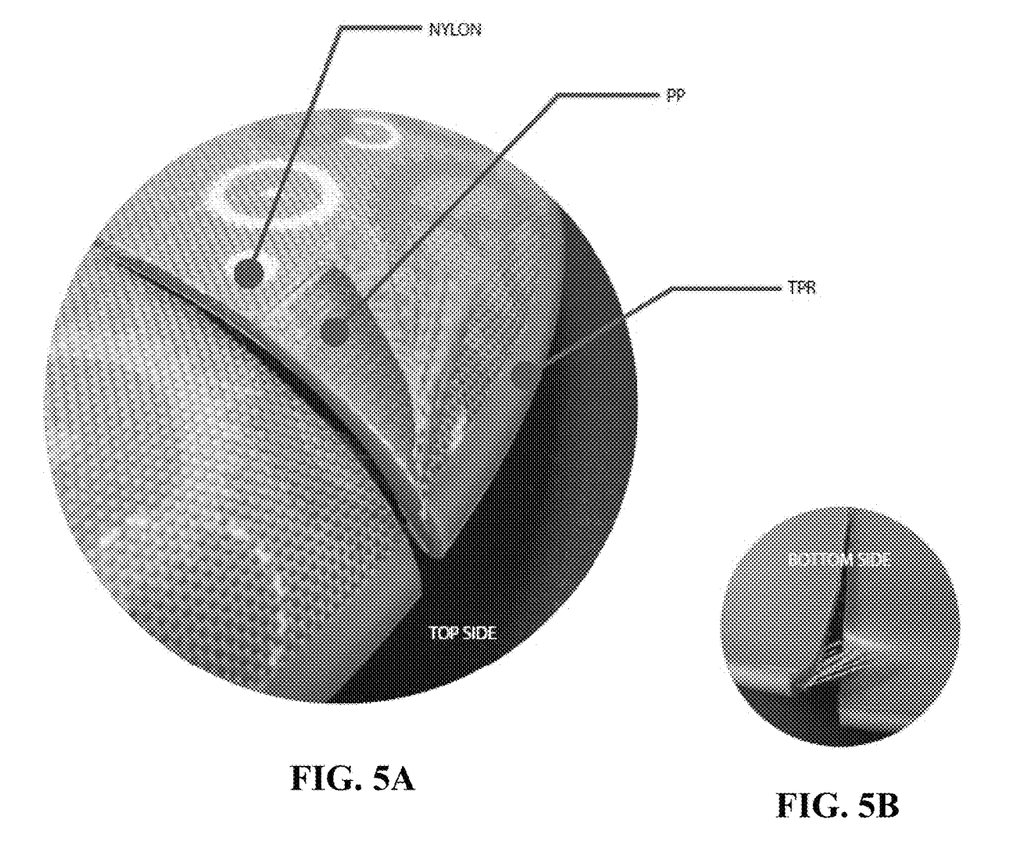
FIG. 5A illustrates a top portion of a disk shape formed in accordance with the process of the present invention, having been cut to expose the cross-sectional build-up of the part, and with an outer layer of nylon having been pulled back to expose a polypropylene core and a thermoplastic elastomer tip.
FIG. 5B illustrates a bottom portion of the disk shape of FIG. 5A.

FIG. 5A illustrates a top portion of a disk shape formed in accordance with the process of the present invention, having been cut to expose the cross-sectional build-up of the part, and with an outer layer of nylon having been pulled back to expose a polypropylene core and a thermoplastic elastomer tip.

FIG. 5B illustrates a bottom portion of the cut disk shape of FIG. 5A.

Figure 6A:
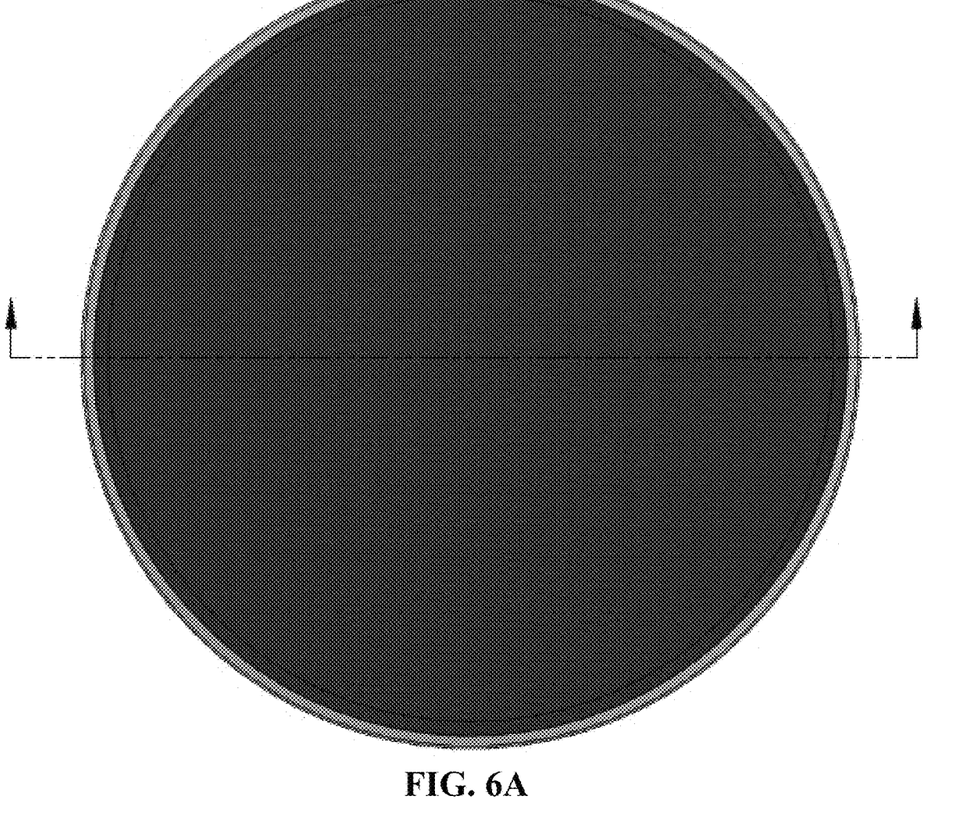
FIG. 6A illustrates a top view of the disk of FIG. 5A.

FIG. 6A illustrates a top view of the disk of FIG. 5A.

Figure 6B:
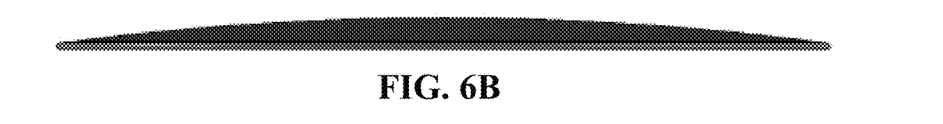
FIG. 6B is a side view of the disk of FIG. 6A.

FIG. 6B is a side view of the disk of FIG. 6A.

Figure 6C:
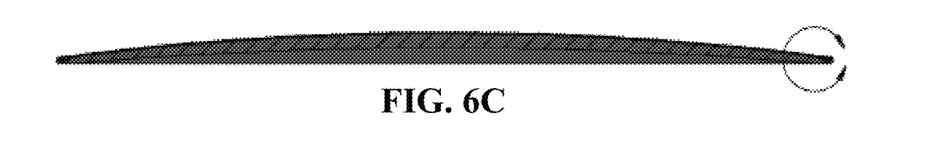
FIG. 6C is a cross-sectional view through the disk of FIG. 6A.
Figure 6D:
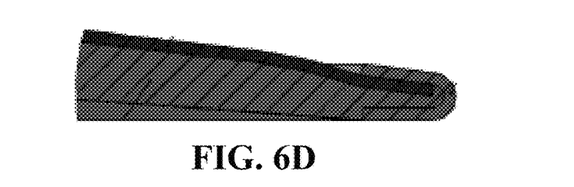
FIG. 6D is an enlarged detail view of the tip of the disk cross-section shown in FIG. 6C.

FIG. 6C is an enlarged detail view of the tip of the disk cross-section shown in FIG. 6C.

In another embodiment, the molding process may also be in accordance with one or more of the following steps. First, cutting the fabric material to fit the tool, which fabric may be an eight oz. canvas (polyester) material. Second, silk-screening a logo onto the cut canvas material. Third, loading (e.g., positioning) the cut canvas into the cavity of the tool. Fourth, injecting the thermoplastic material (e.g., a thermoplastic rubber—TPR) onto the canvas, while at a temperature in the range between 155 degrees Celsius and 195 degrees Celsius. The thermoplastic material used at these temperatures is preferably a thick (viscous) liquid. The thermoplastic material used should also have a durometer in the range of 50A-85A, because a positive correlation between the durometer and temperature is needed (i.e., the temperature needs to be higher when the durometer increases). The time needed to inject the TPR for the exemplary products illustrated herein is 18-25 seconds, which is when the bonding of the TPR to the fabric begins (e.g., by flowing of the liquid thermoplastic elastomer into interstices of the weave of the piece of fabric). The cooling time is related (e.g., proportional) to the amount of TPR needed for the product; the smaller the amount of TPR needed, the shorter the injection time. Also, if the size/weight of the product is larger, or if the tool cavity is complex, the injection time will be longer. Fifth, cooling down the joined fabric and TPR materials, for a time of 25-30 seconds, completing the total bonding process, and being with the result that no glue is needed. The cooling time is dependent upon sufficient of the TPR in order to remove the product out from the tool cavity without any deformation.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A method of over-molding a thermoplastic material over fabric, said method comprising:
   precision forming a cavity of a mold to match the final dimensions of a finished product;
   cutting a piece of fabric to a correct size;
   fixedly securing the piece of fabric in the cavity of the mold;
   heating a thermoplastic material to a temperature transforming it into a flowable liquid state, and being elevated for melting a surface layer of the fabric;
   injecting the heated thermoplastic material into the mold cavity at an appropriate pressure, on top of the fabric piece, causing flowing of the liquid thermoplastic material into interstices of the weave of the piece of fabric; and
   cooling of the thermoplastic material and fabric for bonding and securing of the thermoplastic material to the fabric without an adhesive.

2. The method according to claim 1 further comprising: heating the thermoplastic material with a durometer between 50A and 85A to a temperature in the range between 155 degrees Celsius and 195 degrees Celsius.

3. The method according to claim 1 further comprising adding a UV stabilizer to said over-molded thermoplastic material and fabric after said cooling.

4. The method according to claim 1 further comprising securing a cord member onto an exposed portion of the fabric.

5. The method according to claim 1 further comprising adding an anti-blocking agent to said over-molded thermoplastic material and fabric after said cooling.

6. The method according to claim 1 further comprising adding a slip agent to said over-molded thermoplastic material and fabric after said cooling.

7. The method according to claim 1 further comprising adding a plasticizer to said over-molded thermoplastic material and fabric after said cooling.

8. The method according to claim 1 further comprising adding a flame retardant to said over-molded thermoplastic material and fabric after said cooling.

9. The method according to claim 1 wherein said thermoplastic material and fabric piece are bonded together after said cooling, without the use of a bonding agent.

10. The method according to claim 1, further comprising: silk-screening a logo onto the cut fabric material.

* * * * *